United States Patent [19]

Hara

[11] Patent Number: 5,313,563
[45] Date of Patent: May 17, 1994

[54] METHOD OF CONTROLLING A ROBOT WITH A SUPPLEMENTARY AXIS

[75] Inventor: Ryuichi Hara, Minamitsuru, Japan
[73] Assignee: Fanuc Ltd., Minamitsuru, Japan
[21] Appl. No.: 752,444
[22] PCT Filed: Dec. 14, 1990
[86] PCT No.: PCT/JP90/01645
§ 371 Date: Aug. 19, 1991
§ 102(e) Date: Aug. 19, 1991
[87] PCT Pub. No.: WO91/09710
PCT Pub. Date: Jul. 11, 1991

[30] Foreign Application Priority Data

Dec. 25, 1989 [JP] Japan ................. 1-335833

[51] Int. Cl.[5] .............. G06F 15/00; G05B 19/00; B25J 9/06
[52] U.S. Cl. .................... 395/86; 395/82; 395/97
[58] Field of Search ............ 395/82, 83, 86, 89, 395/97

[56] References Cited

U.S. PATENT DOCUMENTS

| | | | |
|---|---|---|---|
| 4,712,183 | 12/1987 | Shiroshita et al. | 395/83 |
| 4,744,039 | 5/1988 | Suzuki et al. | 395/86 |
| 4,761,745 | 8/1988 | Kodaira | 395/86 |
| 4,771,222 | 9/1988 | Nakashima et al. | 395/86 |
| 4,815,006 | 3/1989 | Andersson et al. | 395/86 |
| 4,831,547 | 5/1989 | Ishiguro et al. | 395/86 |
| 4,836,742 | 6/1989 | Ishiguro et al. | 395/82 |
| 5,020,001 | 5/1991 | Yamamoto et al. | 395/86 |

FOREIGN PATENT DOCUMENTS

0172486A2  2/1986  European Pat. Off. .
2712811  9/1977  Fed. Rep. of Germany .

OTHER PUBLICATIONS

Richard Weston, *Robot workplaces*, Jun. 1984, vol. 8, No. 5, pp. 245-248.

*Primary Examiner*—Allen R. MacDonald
*Attorney, Agent, or Firm*—Staas & Halsey

[57] ABSTRACT

A method of controlling a robot with a supplementary axis, whereby a tool center point (TCP) of the robot is controlled in response to a movement of the supplementary axis. The supplementary axis is moved manually (S1), and the resulting coordinate position of the supplementary axis is read (S2), the coordinates and posture of the tool center point (TCP) that keep the position and posture of the supplementary axis in relation to the robot tool center point (TCP) unchanged are determined (S3), and the tool center point (TCP) is moved to the determined position and posture are changed accordingly. Thus, the relationship between the position of the supplementary axis, such as a table or the like, and the position and posture of the tool center point (TCP) remains unchanged.

2 Claims, 3 Drawing Sheets

METHOD OF CONTROLLING A ROBOT WITH A SUPPLEMENTARY AXIS

BACKGROUND OF THE INVENTION

1. Field of the Invention

The present invention relates to a method of controlling a robot with a supplementary axis, whereby robot is controlled by following the supplementary axis, and more particularly, to a method of controlling a robot with a supplementary axis, whereby the robot is automatically moved in response to a manual jog-run of the supplementary axis.

2. Description of the Related Art

In a welding robot or the like, a table on which a workpiece is fixed is designed to rotate or move in a direction perpendicular to such a rotation. The table is controlled by a supplementary axis control circuit incorporated in a robot control unit. This facilitates the control of the posture of the robot when performing a welding or other machining.

If, however, the table is jogged by the hand, the position and posture of the torch of the welding robot and the work on the table are changed. Therefore, to maintain a constant position and posture, it is necessary to give an instruction to adjust the position and posture of an arm of the robot; and posture. Such an instruction, however, cannot be easily given in a conventional robot, as it requires much time and a complicated teaching procedure.

SUMMARY OF THE INVENTION

An object of the present invention is to solve the above problem and provide a method of controlling a robot with a supplementary axis, to thereby cause the robot to automatically follow a manual feed of the supplementary axis.

To solve the aforementioned problem, the present invention provides a method of controlling a robot with a supplementary axis, to thereby control the tool center point (TCP) of the robot through the supplementary axis. According to the present invention, the supplementary axis is manually fed, a coordinate position of the supplementary axis is read, coordinates and a posture of the tool center point are determined so that the relative position and posture of the supplementary axis coincide with said tool center point of the robot, and the tool center point is then moved accordingly.

When the supplementary axis, such as a table, is moved by hand, the resulting new coordinate position is read through a supplementary axis control circuit, a position and coordinates of the tool center point that correspond to such a movement are determined by a microprocessor which controls the robot, and the arm of the robot is positioned in accordance with the new position and coordinates of the tool center point. This makes it possible to maintain a constant position and posture relationship between the supplementary axis, such as a table, and the tool center point.

DESCRIPTION OF THE PREFERRED EMBODIMENT

An embodiment of the present invention will now be described with reference to the drawings.

Figure 2:
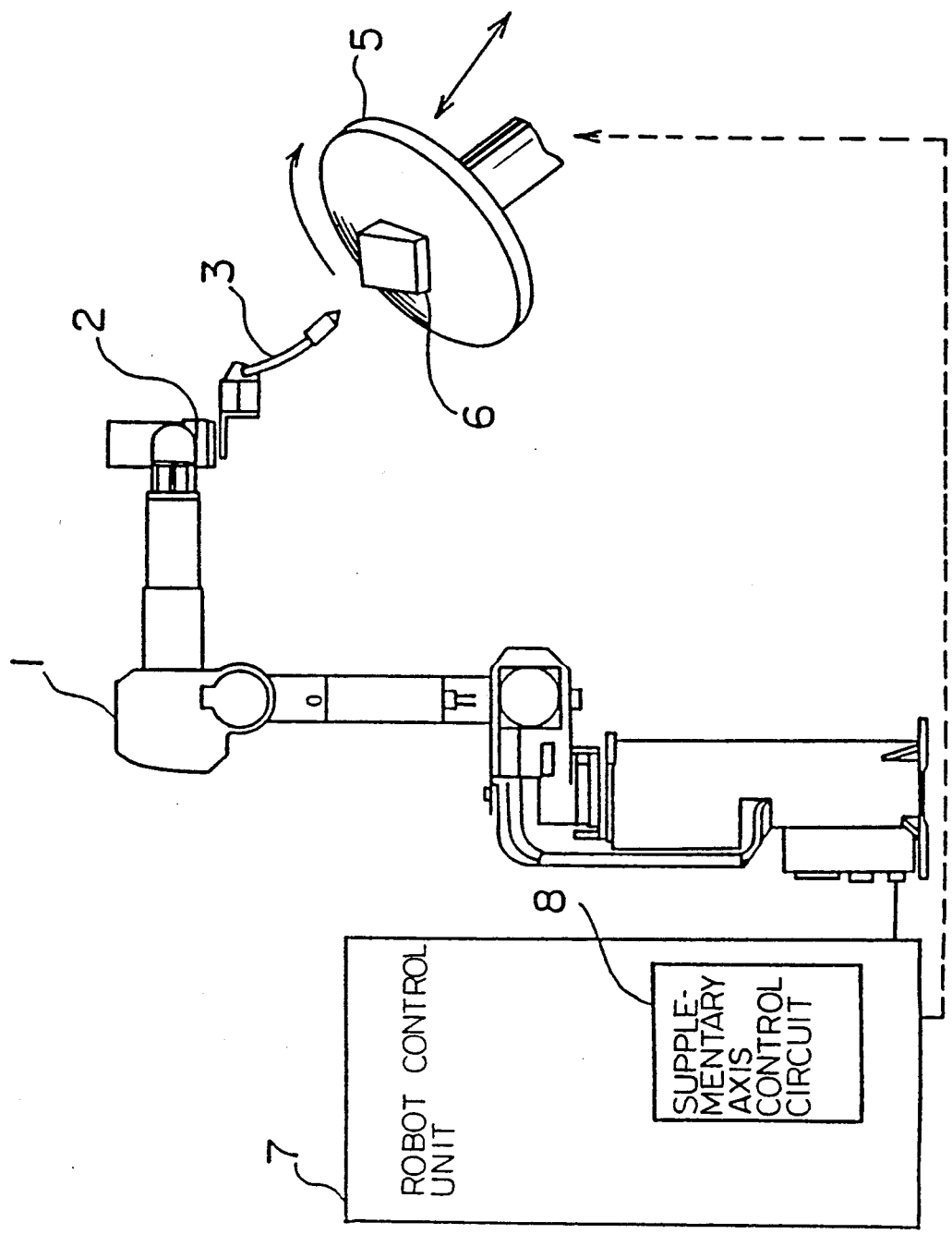
FIG. 2 is a configuration diagram of a robot system for implementing the present invention.

FIG. 2 is a configuration diagram of a robot system according to a first embodiment of the invention, wherein a torch 3 is installed on the end of a wrist 2 of a robot 1. A table 5 is controlled by a supplementary axis control circuit 8 in a robot control unit 7. The table 5 is controlled to rotate and move in a direction perpendicular to the rotation. A workpiece 6 is fixed on the table 5.

The table 5 is rotated or manually jog-run in a vertical direction through a control panel, not shown in the drawing. A microprocessor in the robot control unit 7 reads the coordinates of the table 5 through the supplementary axis control circuit 8 and controls the robot 1 such that the positional relationship between the end of the torch 3 and the workpiece 6 remains unchanged.

Figure 3:
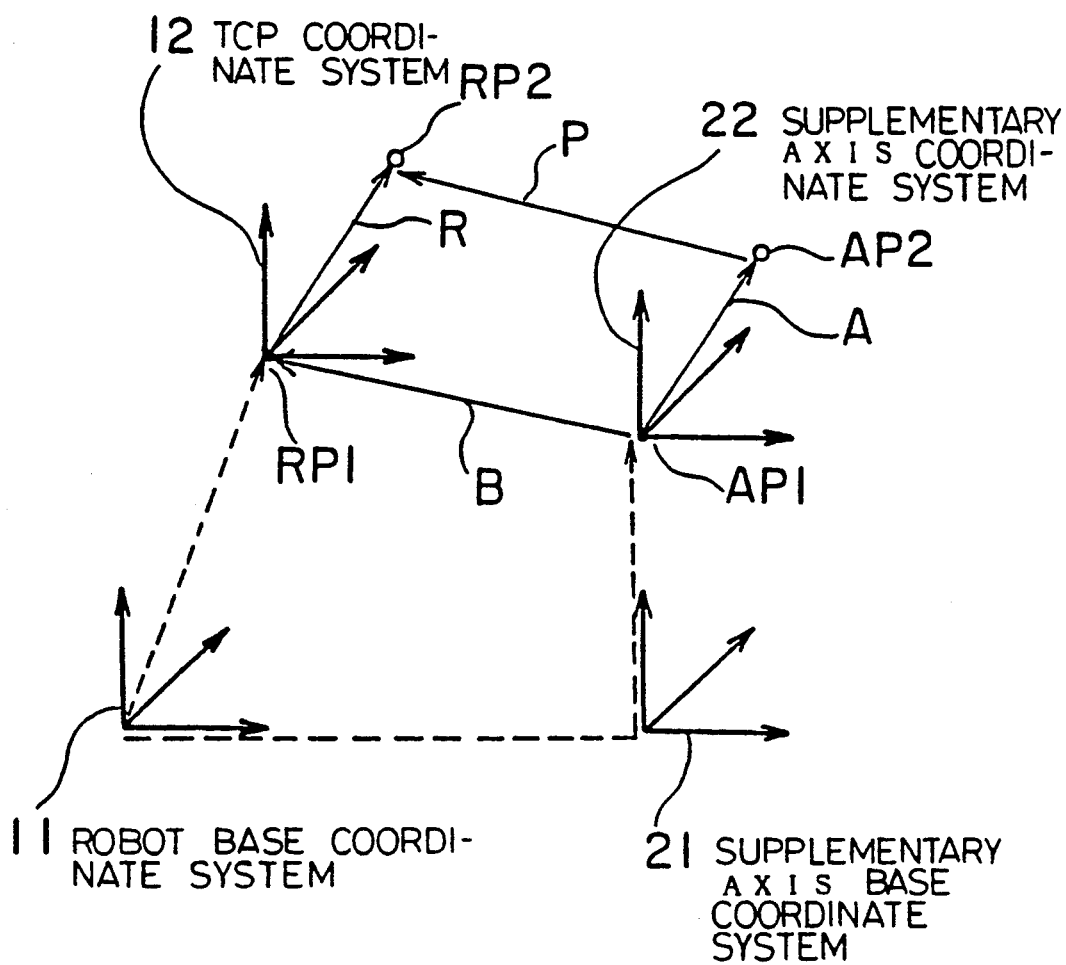
FIG. 3 is a diagram which shows the relationship between the tool center point (TCP) and the coordinate system of the supplementary axis.

FIG. 3 shows the relationship between the tool center point (TCP) and the coordinate system of the supplementary axis. A coordinate system 12 of a robot tool center point (TCP) is provided with respect to a base coordinate system 11 of the robot, and a supplementary axis base coordinate system 21 relating to those coordinate systems 11 and 12 is also provided. This is the coordinate system of the table 5 in FIG. 2. Further, a coordinate system 22 of the supplementary axis is provided with respect to the base coordinate system 21 of the supplementary axis. Here, a coordinate change matrix B is a matrix of a coordinate change from an origin AP1 of the coordinate system 22 of the supplementary axis to the origin RP1 of the coordinate system 12 of the TCP.

The supplementary axis is manually jog-run to a point AP2 by a coordinate change matrix A. At this time, to ensure that the position of the TCP12 is not changed, it is necessary to control the TCP12 so that a coordinate change matrix R shown in the drawing satisfies the following formulas:

$$R = B^{-1} AP \text{ and } P = B$$

A coordinate change matrix P is a coordinate change matrix from the point AP2 to a point RP2. Namely, the coordinate change matrix R is the coordinate change matrix that determines the movement of the TCP12.

Figure 1:
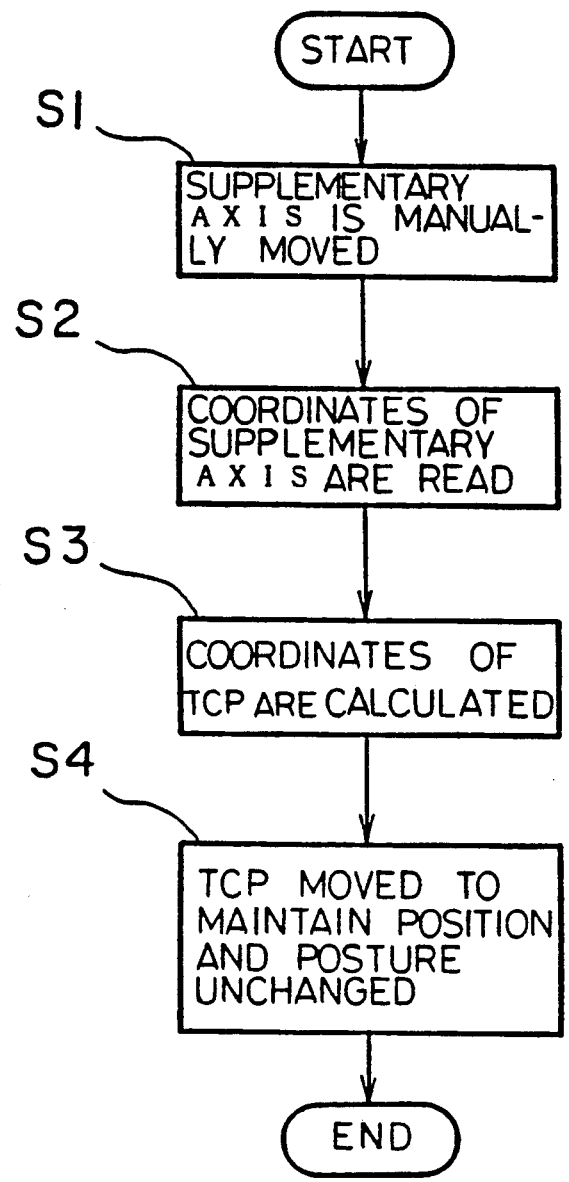
FIG. 1 is a flowchart of a method of controlling a robot with a supplementary axis according to the present invention.

FIG. 1 is a flowchart of the method of controlling a robot with a supplementary axis according to the present invention. In the flowchart, a number that follows S indicates a step number.

[S1] The supplementary axis, i.e., the table 5, is manually jog-run.

[S2] The processor in the robot control unit 7 reads the coordinates of the supplementary axis through the supplementary axis control circuit 8.

[S3] The coordinates of the new point RP2 of the TCP12 are calculated from the coordinate system of the supplementary axis.

[S4] The TCP12 is moved to the point RP2.

Accordingly, when the supplementary axis, such as a table, is moved, the tool center point (TCP) is automatically moved in accordance with the new position and posture of the supplementary axis, such as a table. This eliminates the need to move the robot or control the posture of the robot.

In the above description, the present invention is described in connection with a welding robot. However, the invention may be applied in a similar way to other robots having tables or the like which are controlled through supplementary axes.

As described above, according to the present invention, the robot is automatically adjusted to maintain a constant position and posture thereof by following new coordinates resulting from a manual feed of the supplementary axis. Therefore, even when the supplementary axis is moved, there is no need to control the position or posture of the robot, and thus the teaching efficiency is improved.

I claim:

1. A method of controlling a robot having a supplementary axis, the robot having a tool center point, each of said supplementary axis and said tool center point having a position and a posture, comprising the steps of:
    (a) manually moving the supplementary axis;
    (b) reading, after step (a), the resulting coordinate position of said supplementary axis;
    (c) determining coordinates and the posture of said tool center point at which said tool center point would have the same position and posture relative to said supplementary axis after step (a) as the position and posture of the tool center point relative to said supplementary axis before step (a); and
    (d) moving said tool center point in accordance with said coordinates and the posture determined in step (c).

2. A method of controlling a robot having a supplementary axis according to claim 1, wherein said robot has an end on which a welding torch is mounted, said welding torch having a position and posture, and wherein step (d) includes the substep of:
    moving said welding torch to a position and posture relative to said supplementary axis which is the same as the position and posture of said welding torch relative to said supplementary axis before step (a).

* * * * *